INVENTOR
RICHARD F. POST

BY Browne, Schuyler, & Beveridge

ATTORNEYS.

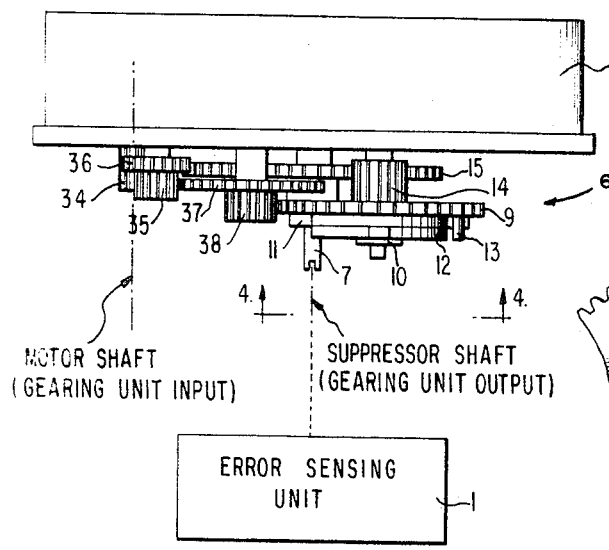

United States Patent Office 3,436,967
Patented Apr. 8, 1969

3,436,967
MECHANICAL SUPPRESSOR FOR JITTERY SHAFT
Richard F. Post, Mountain Lakes, N.J., assignor to Aircraft Radio Corporation, Boonton, N.J., a corporation of New Jersey
Filed Aug. 18, 1965, Ser. No. 480,652
Int. Cl. G01d 11/10; G08c 19/02
U.S. Cl. 73—430                                       4 Claims

ABSTRACT OF THE DISCLOSURE

A mechanical device for suppressing unwanted fluctuations or "jitter" in instrument indicators where an adjustable lost motion device is placed in the gear train of an instrument between the instrument motor output shaft and the indicator positioning shaft.

---

Figure 1:
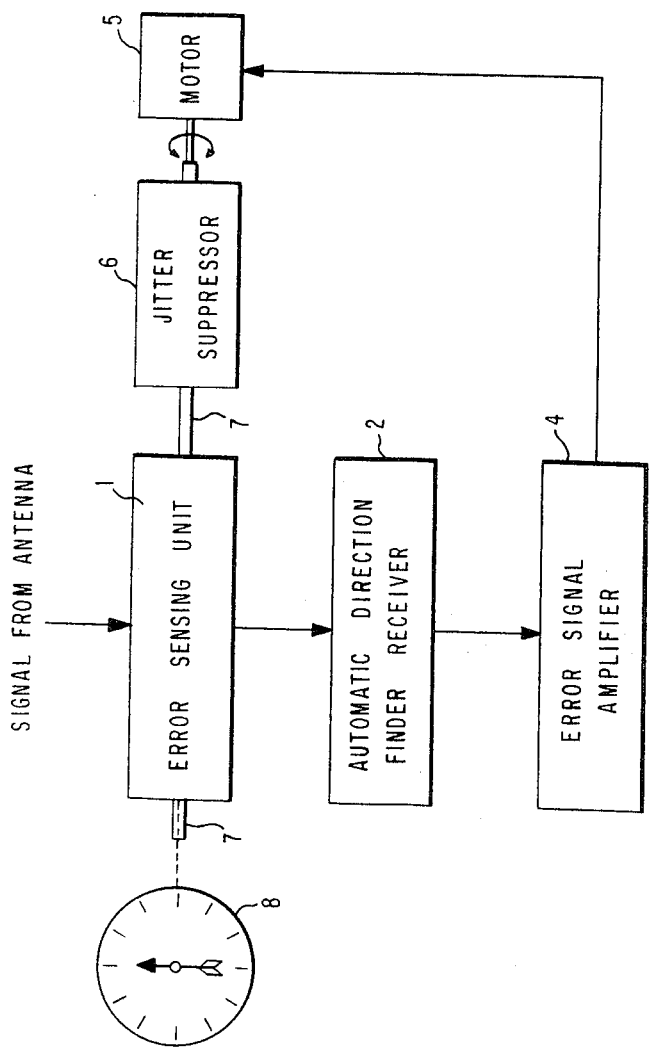

The present invention relates to mechanical devices utilized to suppress the transmission of unwanted fluctuations or "jitter" to indicators of instruments such as those used in aircraft.

The jittery needle problem has always plagued certain types of instruments. The problem manifests itself as a random indicator fluctuation about the true or desired indication which is almost certain to cause error and inconvenience when the indicator is read.

Indicator jitter is caused by unwanted electrical or mechanical variations. A quite common source of the jitter is the random electrical or mechanical noise inherent in the sensing portions of instruments that are being positioned by null-seeking servo systems. In such instruments, the sensing device, such as a goniometer or potentiometer, is caused to seek a null or "no signal" condition. As such nulls are of exceedingly narrow angular width, any noise or signal disturbance tends to cause the sensing device to move, on a random basis, away from the null. This movement is generally small, but results in the indicators showing a reading which fluctuates around the desired indications. The characteristic of the noise causing the excursion is essentially Gaussian, hence the probability of fluctuation or deviation from the true null is Gaussian in numbers and amplitude of displacement.

The present invention solves the problem of indicator fluctuations by introducing a predetermined amount of lost motion between the indicator's positioning device and the indicator's readout device (needle, counter, bar, etc.). The positioning device still produces the unwanted fluctuations but the suppressor mechanism transmits only rotational movement to the indicator which exceeds a predetermined amount, absorbing the small and random fluctuations.

It is important to observe that excursions of the input shaft to the mechanical suppressor which exceed the preset jitter suppression angle have equal probability of being clockwise or counterclockwise in direction. Since the suppressor mechanism will be driven equally in both directions, but not simultaneously, it will assume the average position dictated by the random noise. In other words, it will center itself with respect to the noise energy. This noise center is also the "true" and accurate reading desired from the indicator, so the device has not only reduced the indicator fluctuations, it has averaged them to provide an accurate reading.

It is therefore an object of the present invention to provide an instrument combination which is free from indicator jitter.

Other objects of the present invention will be apparent from the following specification and claims, considered with the drawings wherein:

FIGURE 1 illustrates an overall combination of the invention;
FIGURE 2 illustrates the mounted suppressor mechanism;
FIGURE 3 is a perspective view of the essential elements of the suppressor mechanism; and
FIGURE 4 is a view of the assembled suppressor mechanism.

FIGURE 1 illustrates the suppressor mechanism in combination with an instrument in accordance with the invention. Error sensing unit 1, in this case a goniometer, receives navigational signals from an antenna (not shown). The signal is coupled through the error sensing unit to automatic direction finder receiver 2, which is tuned to the frequency of the desired navigation station. Output signals from the receiver are applied to error signal amplifier 4 which provides power amplification necessary to operate motor 5.

Motor 5 drives error sensing unit 1 through jitter suppressor 6. A voltage is developed within sensing unit 1 in well-known fashion, corresponding to the position of suppressor output shaft 7. Motor 5 continues to drive sensing unit 1 until the error signal applied to receiver 2 is reduced to zero. The correct station bearing can now be read from dial 8.

Random motion of the motor shaft caused by amplified noise near and at null is absorbed by the jitter suppressor and does not reach the dial pointer.

It is pointed out that the suppressor is not intended to be limited to the combination with the particular goniometer instrument illustrated in FIGURE 1. Any type of instrument, and there are many, which is susceptible to the jitter problem may utilize a suppressor mechanism in accordance with the invention.

FIGURE 2 illustrates the mounted suppressor mechanism in combination with an exemplary gear train as may be employed in the combination of FIGURE 1. Amplified signals applied to motor 5 from error signal amplifier 4 cause the motor to position gear 34 accordingly. In the gearing system shown, motor gear 34 drives a gear train 35, 36, 37, 38 which in turn drives input driven gear 9 of the suppressor mechanism. It is sufficient for the explanation of FIGURE 2 to note that the suppressor mechanism driven gear 9 is mounted on shaft 10 where it is free to turn within certain limits. The limits are established by cooperation of cam 11 and circular plate 12, which are fixedly mounted on shaft 10. Driven gear 9 freely rotates on the shaft until pin 13, attached thereto, strikes either cam 11 or plate 12 and causes shaft 10 and associated indicator driving gear 14 to rotate. Driving gear 14 is meshed with indicator gear 15. Shaft 7, attached to indicator gear 15, drives the voltage producing elements within error sensing unit 1 and positions the indicator of dial 8 (FIGURE 1).

Essential elements of the suppressor mechanism are illustrated in FIGURE 3. Indicator driving gear 14 includes a shaft 10 having a shoulder portion 16, which serves as a bearing upon which the motor-driven gear 9 freely rotates. Motor-driven gear 9 is provided with a suitably sized centrally located aperture 24 for mounting on the shoulder 16. Projecting from the face of the driven gear opposite the driving gear 14 is a pin 13. Cam 11 has an aperture 25 of a size to cause the cam to firmly grip the shaft 10, and is divided into circular halves, each being of a different radius. The radius of the smaller half of the cam is less than the distance of the pin 13 from the center of shaft 10, whereas the radius of the larger half is greater than the distance of the pin from the shaft's center so that the end portions 17, 18 of the larger half establish maximum limits beyond which the gear 9 may not rotate without turning the cam 11 and the indicator driving gear 14.

Circular plate 12, having a radius less than the distance of the pin 13 from the center of the shaft 10, is rotatably mounted on the shaft 10 by a suitably sized aperture 26. The plate has a peripheral projection 19 having a radius approximately equal to that of the larger half of the cam. Provision for adjustably fastening the plate to the cam is made by a screw 20 which passes through an arcuate slot 21 in the plate. Cam 11 is provided with a threaded hole 22 to receive the screw. Arcual slot 21 allows the plate 12 to be rotated on the shaft in relation to the cam 11 so that the angular distance between the projection 19 and one of the end portions 17, 18 may be changed to adjust the amount of lost motion introduced between the actuating input and the indicator. The setting of the plate in relation to the cam is determined by the amount of random fluctuation to be absorbed or averaged in a particular application of the invention.

The operation of an instrument utilizing the suppressor mechanism of this invention may be explained in considering FIGURE 4. Motor shaft rotation, containing random fluctuation, is applied through the last gear 38 of a gear train to the driven gear 9 of the suppressor mechanism. If the erratic motion results in an angular movement of the pin 13 which is less than the distance bounded by the projection 19 and the associated end portion 18, no rotation is coupled to cam and plate assembly 11, 12. The indicator gear 15 thereby remains stationary and free from jitter.

When the shaft input is continuous in one direction, as during the period when true information changes are occuring, the pin travels in an angular arc until it strikes either the projection 19 or the end portion 18. Motion thereby coupled to the cam and plate assembly 11, 12 causes the indicator to be repositioned. As is readily apparent, the lost motion mechanism is mounted on the instrument by placing it on a shaft 27 which is suitably sized to rotatably mount the indicator driving gear 14. The latter is provided with a bore 28 for this purpose. The suppressor mechanism may be held on the shaft 27 by any suitable fastener such as a snap ring 29.

The suppressor mechanism of this invention is self-centering, since the random fluctuations which normally occur have a time average of zero. The indicator is centered by the suppressor mechanism within the total input, including the jitter, which is the "true information" position.

It is again emphasized that the suppressor mechanism may be combined with any type of instrument in which the jitter problem is encountered.

What is claimed is:
1. In a mechanical device for suppressing unwanted fluctuations of instrument indicators, the combination comprising:
    signal sensing means for generating an indicator actuating signal;
    an ouput gear with a shaft extending axially from one face;
    an input gear positioned according to the indicator actuating signal rotatively mounted upon the shaft and including a pin projecting from one face;
    cam means fixedly mounted on the shaft and shaped so as to allow the input gear to turn freely for less than a full revolution by limiting the travel of the pin;
    a circular plate adjustably mounted upon the shaft and having a peripheral projection disposed so as to cooperate with the cam means to selectively limit the free travel of the pin and the input gear; and
    an instrument indicator positioned by said output gear; whereby jitter in the instrument indicator is suppressed.

2. In a mechanical device for suppressing unwanted fluctuations of instrument indicators, the combination comprising:
    signal sensing means for generating an indicator actuating signal;
    an output gear with a shaft extending axially from one face, the shaft including a shoulder portion;
    an input gear positioned according to the indicator actuating signal rotatively mounted on the shoulder portion and including a pin projecting from one face;
    cam means fixedly mounted on the shaft and shaped so as to allow the input gear to freely turn for less than a full revolution by limiting the travel of the pin;
    a circular plate adjustably mounted on the shaft and having a peripheral projection disposed so as to cooperate with the cam means to selectively limit the free travel of the pin and the input gear; and
    an instrument indicator positioned by said output gear; whereby jitter in the instrument indicator is suppressed.

3. In a mechanical device for suppressing unwanted fluctuations of instrument indicators, the combination comprising:
    an output gear with a shaft extending axially from one face;
    an input gear associated with an actuating means, rotatively mounted upon the shaft and including a pin projecting from one face;
    cam means fixedly mounted upon the shaft and shaped so as to allow the input gear to turn freely for less than a full revolution by limiting the travel of the pin; and
    a circular plate adjustably mounted upon the shaft and having a peripheral projection disposed so as to cooperate with the cam means to selectively limit the free travel of the pin and the input gear.

4. In a mechanical device for suppressing unwanted fluctuations of instrument indicators, the combination comprising:
    an output gear with a shaft extending axially from one face, the shaft including a shoulder portion;
    an input gear associated with an actuating means, rotatively mounted on the shoulder portion and including a pin projecting from one face;
    cam means fixedly mounted on the shaft and shaped so as to allow the input gear to turn freely for less than a full revolution by limiting the travel of the pin; and
    a circular plate adjustably mounted on the shaft and having a peripheral projection disposed so as to cooperate with the cam means to selectively limit the free travel of the pin and the input gear.

References Cited

UNITED STATES PATENTS

| 1,959,144 | 5/1934 | Wittkuhns | 33—226.6 X |
| 2,585,956 | 2/1952 | McCarthy | 33—204.43 X |
| 3,257,852 | 6/1966 | Perkins | 73—414 |
| 2,023,235 | 12/1935 | Le Court. | |
| 2,378,114 | 6/1945 | Van Donk. | |
| 3,069,668 | 12/1962 | Siderman | 340—198 X |

LOUIS R. PRINCE, *Primary Examiner.*

D. M. YASICH, *Assistant Examiner.*

U.S. Cl. X.R.

33—226; 116—124; 340—187